United States Patent Office 2,920,129
Patented Jan. 5, 1960

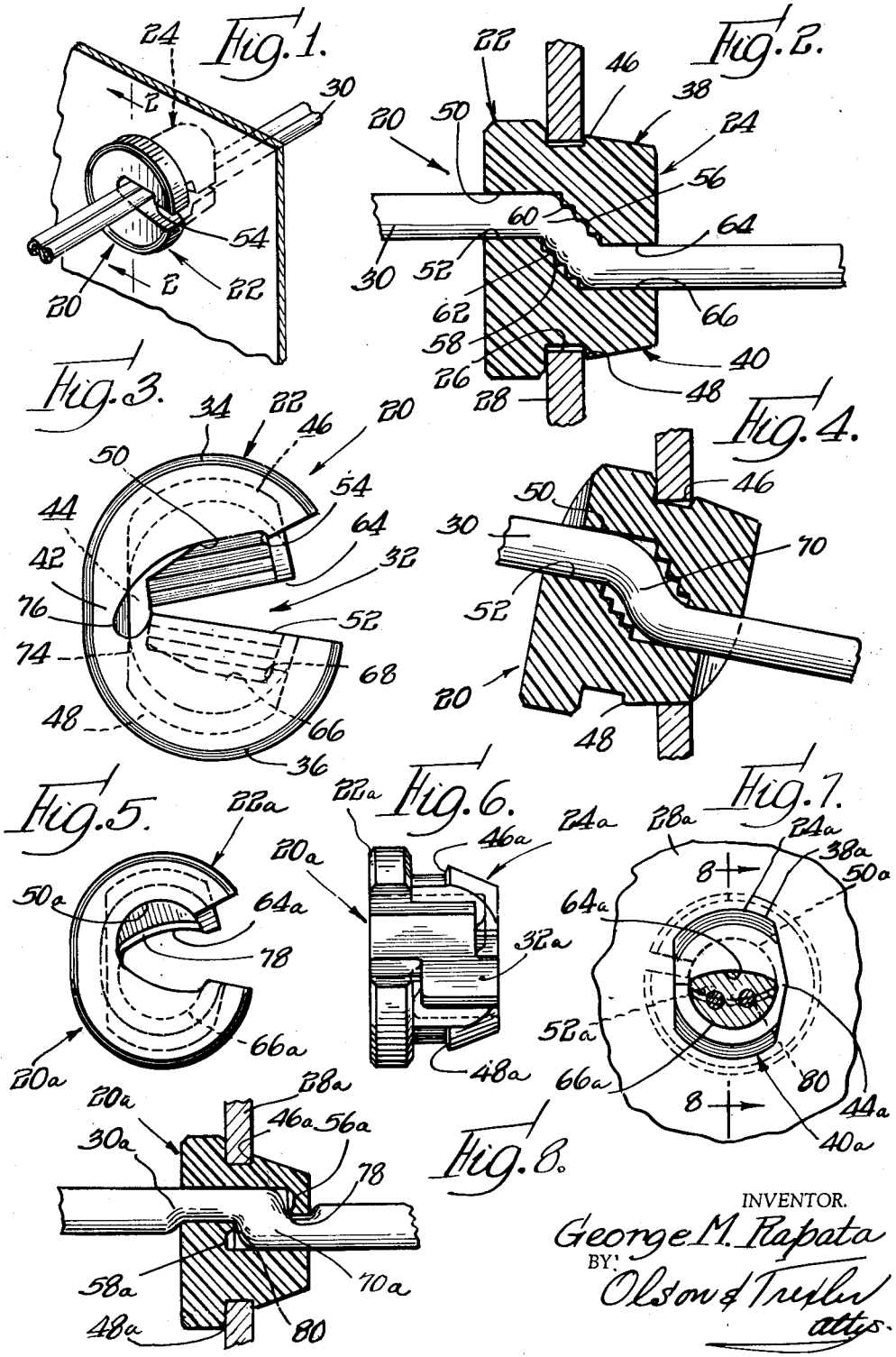

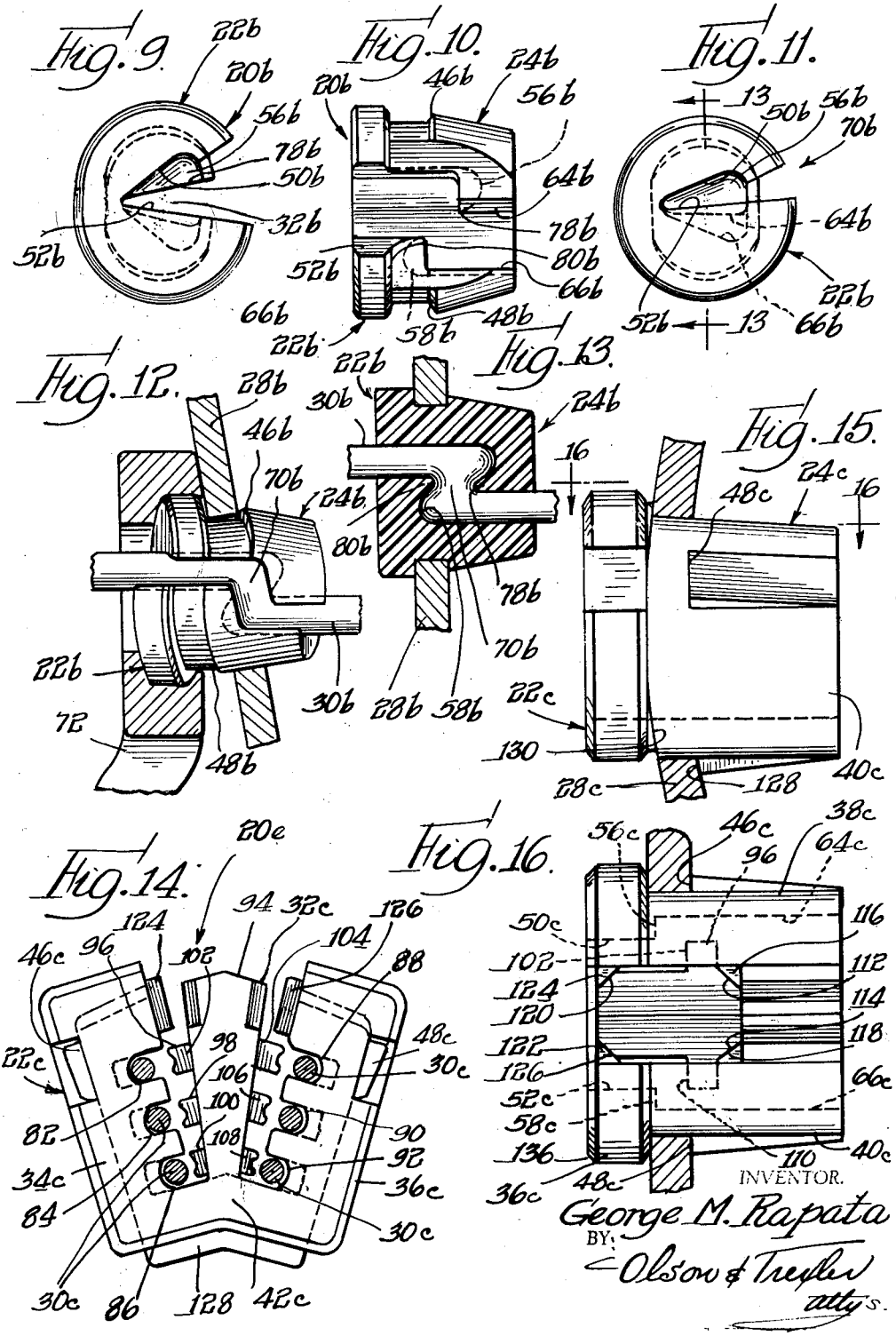

2,920,129

STRAIN RELIEF GROMMET

George M. Rapata, Park Ridge, Ill., assignor to Illinois Tool Works, Chicago, Ill., a corporation of Illinois Application December 5, 1956, Serial No. 626,526

5 Claims. (Cl. 174—153)

The present invention relates to a novel strain relief grommet, and more particularly to a novel grommet adapted to be applied to an apertured workpiece and to secure an elongated element or wire.

An object of the present invention is to provide a novel strain relief grommet which is adapted more effectively to grip an intermediate portion of a wire or the like extending therethrough for preventing transmission of any strain applied to one portion of the wire at one side of the grommet to another portion of the wire at the opposite side of the grommet.

A more specific object of the present invention is to provide a novel grommet which is formed so that when it is applied to a wire and then to an apertured workpiece, sections thereof will be relatively axially shifted so as to accomplish a more secure gripping of an intermediate portion of a wire extending therethrough.

A further object of the present invention is to provide a novel one-piece grommet of the above described type which, when applied to a wire, is distorted so as to facilitate application thereof to an apertured workpiece.

A more specific object of the present invention is to provide a novel strain relief grommet which is adapted to accommodate a plurality of wires and to insulate or space such wires from each other.

A further object of the present invention is to provide a novel one-piece strain relief grommet of the above described type which may be easily and economically molded from plastic material.

Other objects and advantages of the present invention will become apparent from the following description and the accompanying drawings wherein:

Fig. 1 is a fragmentary perspective view showing a strain relief grommet incorporating the features of the present invention applied to a wire and also applied to an apertured workpiece;

Fig. 2 is an enlarged partial sectional view taken along line 2—2 in Fig. 1;

Fig. 3 is an enlarged end view of the grommet shown in Fig. 1 in its initial molded condition or, in other words, in its condition before it is applied to a wire or an apertured workpiece;

Fig. 4 is a partial sectional view showing how the grommet is substantially helically distorted when applied to a wire so as to facilitate application of the grommet to an apertured workpiece and further showing the manner in which the grommet is applied to an apertured workpiece;

Fig. 5 is an end view showing a strain relief grommet incorporating a modified form of the present invention;

Fig. 6 is a side elevational view of the grommet shown in Fig. 5;

Fig. 7 is an entering end view of the grommet shown in Figs. 5 and 6 with the grommet fully applied to a wire and to an apertured workpiece;

Fig. 8 is a partial sectional view taken along line 8—8 in Fig. 7;

Fig. 9 is a head end view of a strain relief grommet incorporating another embodiment of the present invention;

Fig. 10 is a side elevational view of the grommet shown in Fig. 9;

Fig. 11 is a head end view of the grommet shown in Figs. 9 and 10 with the grommet in a collapsed condition for gripping a wire;

Fig. 12 is a partial sectional view showing the manner in which the grommet of Figs. 9–11 is applied to a wire and then applied to an apertured workpiece;

Fig. 13 is a sectional view taken generally along line 13—13 in Fig. 11 and further showing the grommet fully applied to a wire and to an apertured workpiece;

Fig. 14 is a head end view of another modified form of the present invention adapted to accommodate a plurality of separate wires;

Fig. 15 is a partial sectional view showing the embodiment of Fig. 14 fully applied with the wires to an apertured workpiece; and Fig. 16 is a fragmentary sectional view taken along line 16—16 in Fig. 15.

Referring now more specifically to the drawings wherein like parts are designated by the same numerals throughout the various figures, a strain relief grommet 20 incorporating features of the present invention is shown in Figs. 1–4. The grommet which is preferably molded in one piece from suitable plastic material such as nylon comprises a head section 22 engageable with one side of an apertured workpiece and a shank or body section 24 adapted to be inserted through an aperture 26 in a workpiece 28. As shown in Fig. 3, the grommet is formed so that when it is an unstressed condition prior to assembly with either a wire 30 or the apertured workpiece a tortuous slot or passageway 32 extends through the head and shank sections for separating the head section into diverging portions 34 and 36 and similarly separating the shank section into laterally diverging portions 38 and 40. The head portions 34 and 36 diverge from an integral hinge portion 42, and the shank portions similarly diverge from an integral axially extending hinge portion 44. The shank portions 38 and 40 are respectively provided with oppositely projecting shoulders 46 and 48 which are engageable beneath the apertured workpiece when the grommet is applied to the workpiece in the manner described below for cooperating with the head section to secure the grommet to the workpiece.

The portion of the central slot or passageway 32 extending through the head section is defined by substantially axially extending surfaces 50 and 52 of the head portions 34 and 36 respectively. It is to be noted that the surface 52 is disposed so that it will be in a plane substantially parallel to a central longitudinal axis of the grommet and slightly laterally offset from this axis in a direction toward the surface 50 when the opposing head and shank portions have been pivoted toward each other about their respective hinge portions and the grommet is fully applied to a workpiece as shown in Fig. 2. The surface 50 is disposed so that when the grommet is fully applied to a workpiece the surfaces 50 and 52 will be laterally spaced apart sufficiently to accommodate the wire 30 therebetween. In addition it is to be noted that the head portion 34 is formed so as to provide the surface 50 with a hooked portion 54 at its margin opposite from the hinge portion 42, which hooked portion projects toward the surface 52 for preventing lateral displacement of the wire from the slot or passageway when the wire and grommet are assembled with an apertured workpiece as shown best in Fig. 1.

An intermediate portion of the slot or passageway 32 is defined by surfaces 56 and 58 of the shank portions 38 and 40, which surfaces extend transversely of the longitudinal axis of the grommet and are respectively provided with a series of ridges or steps 60 and 62. Substantially axially extending surfaces 64 and 66 of the shank portions 38 and 40 respectively define a last portion of the central slot or passageway, which surfaces are similar to the surfaces 50 and 52 but are arranged so that they will be on an opposite side of a plane containing the central longitudinal axis of the grommet from the surfaces 50 and 52 when the grommet is fully applied to an apertured workpiece. As shown in Fig. 3, the surface 66 has a hooked axially extending marginal portion 68 which projects toward the surface 64 and corresponds to the above described hooked portion 54 for further retaining the wire against any possibility of lateral displacement from the slot when the grommet is fully applied to a workpiece.

When assembling the grommet with a wire and a workpiece, the wire is first forced laterally into the slot through the open side thereof until the wire is wedged between the diverging surfaces of the head and body sections which define opposite sides of the slot. It is to be noted that this operation requires an intermediate portion 70 of the wire to be laterally bent in order to pass between the opposing laterally extending and stepped surfaces 56 and 58. However, the inherent stiffness of the wire resists such bending sufficiently to cause the hinge portions 42 and 44 to be twisted or deformed both longitudinally and transversely of the grommet when the opposing grommet portions are moved together to grip the wire whereby the opposed grommet portions will be axially offset or helically arranged as shown in Fig. 4 prior to assembly of the grommet with the apertured workpiece. This helical twisting of the grommet is promoted by reason of the fact that engagement of the transverse slot surface 56 with one side of the wire tends to axially shift the head and shank portions 34 and 38 respectively toward the right as viewed in Fig. 4 and engagement of the transverse slot or passageway surface 58 with the wire tends to shift the head and shank portions 36 and 40 axially toward the left as viewed in Fig. 4. A special tool 72, which is shown in part in Fig. 12, may be used for grasping the helically deformed head section of the grommet and assembling the grommet with the apertured workpiece. Such assembly with the workpiece is facilitated by the helical deformation of the grommet since, as shown in Fig. 4, the grommet may be tilted with respect to the workpiece so that the shoulder 46 may be easily passed through the aperture and beneath the workpiece after which the grommet may be forced so that the shoulder 48 is snapped through the aperture and beneath the workpiece. It is to be noted that when the grommet is fully applied to the workpiece as shown in Fig. 2, the opposing head and shank sections will have been reversely relatively axially shifted so as to remove the helical deflection from the grommet. As a result the intermediate portion 70 of the wire is tightly clamped between the opposing transverse surfaces 56 and 58 of the central passageway whereby any tensions or strains applied to either of the wire portions extending from opposite ends of the grommet will not be transmitted through the intermediate wire portion to the wire portion at the opposite end of the grommet. The wire gripping action in this embodiment is further enhanced by the projections or steps 62 and 60 of the transverse surfaces 56 and 58 which are impressed into the wire so as to provide a mechanical interlock between the grommet and the wire. It is further to be noted that at least one side 74 of the shank section is substantially flat as shown in Fig. 3, which flat side is adapted to cooperate with a straight edge of a workpiece aperture so as to prevent the grommet from rotating within the workpiece aperture. As shown best in Fig. 3, the hinge portion 42 of the head section may be relieved as indicated by the numeral 76 for facilitating flexing of the head section in the desired manner.

Figs 5-8 show a modified form of the present invention which is similar to the above described structure as indicated by the application of identical reference numerals with the suffix a added to corresponding elements.

While the embodiment described above is especially adapted for accommodating a generally flat wire structure, the central slot or passageway through the grommet 20a is modified so that the grommet is especially adapted for accommodating a substantially circular wire. More specifically, the surfaces 50a and 66a have a rounded transverse cross section so as better to accommodate a rounded wire. Also in this embodiment, the transverse surfaces 56a and 58a are disposed substantially perpendicular to the longitudinal axis of the grommet and respectively terminate in oppositely axially projecting ribs 78 and 80 so that when the grommet is fully assembled with a wire and a workpiece as shown in Fig. 8, the intermediate wire portion 70a will be tightly clamped into a generally Z-shape and securely gripped so as to prevent the transmission of any strains from the wire portion at one side of grommet to the other wire portion at the opposite side of the grommet.

Figs. 9-13 show another embodiment 20b of the present invention. This grommet is similar to the grommet 20 described above in that the central slot or passageway is especially adapted for accommodating a generally flat wire. This grommet is also similar to the embodiment shown in Figs. 5-8 in that the transverse surfaces 56b and 58b have reversely extending portions or oppositely axially projecting ribs 78b and 80b so that the intermediate wire portions 70b will be deformed substantially into a Z-shape and tightly gripped as shown in Fig. 13. Fig. 12 shows how this embodiment as well as the above described embodiments are helically deflected and gripped by a special tool 72 for application to an apertured workpiece.

In Figs. 14-16 there is shown another modified form of the present invention which is similar to the above described embodiment as indicated by the application of identical reference numerals with the suffix c added to corresponding elements. This embodiment is particularly adapted to accommodate a plurality of wires 30c and to grip the wires so that they are spaced from and electrically insulated from each other. More specifically, passageways 82, 84 and 86 are formed in the head and shank portions 34c and 38c each of which passageways is partially defined by generally axially extending surfaces 50c and 64c and an intermediate transversely disposed surface 56c as shown best in Fig. 16. Similar passageways 88, 90 and 92 are provided in the head and shank portions 36c and 40c, each of which passageways is partially defined by generally axially extending opposite end surfaces 52c and 66c and an intermediate transversely disposed surface 58c. In this embodiment the head and shank sections include a central tongue-like portion 94 extending from an integral junction with the hinge portions and substantially traversing the slot 32c. Fingers 96, 98 and 100 extend from one side of the tongue-like portion 94 for projecting into the passageways 82—86 respectively, each of which fingers has an upper surface 102 opposing the surface 56c of its associated passageway and cooperable with the surface 56c for gripping the wire. Additional fingers 104, 106 and 108 extend laterally from the opposite side of the tongue portion of the shank section for projecting into the passageways 88—92 respectively, which additional fingers have an upper surface 110 cooperable with an opposing surface 58c for gripping the wire. When the grommet 20c is applied to the wires, the tongue portion 94 will initially be deflected downwardly as viewed in Fig. 14 relative to the remaining portions of the head and shank sections. Then when the grommet is applied to the apertured workpiece, the tongue portion is reversely deflected axially relative to the remaining head and shank portions of the grommet so that the wires will be tightly clamped between the opposing surfaces 56c—102 and 58c—110. This action is promoted by providing downwardly converging cam surfaces 112 and 114 on a lower outer end margin of the tongue portion as shown in Fig. 16, which cam surfaces are respectively engaged by complementary inwardly projecting cam elements 116 and 118 respectively integral with the shank portions 38c and 40c. Similar but upwardly converging cam surfaces 120 and 122 are provided on an upper marginal portion of the tongue for engagement by cooperable inwardly projecting cam elements 124 and 126 respectively extending from the head portions 34c and 36c so that when the grommet is fully assembled with the workpiece the tongue portion is effectively locked against further axial displacement in either direction.

The grommet 20c is provided with shoulder elements 46c and 48c respectively along opposite sides of the shank portions 38c and 40c and also with shoulder means 128 disposed along the side of the grommet including the hinge portions. All of these shoulder means have downwardly and inwardly inclined outer cam surfaces for facilitating insertion of the shank section through an aperture in a workpiece. As shown best in Fig. 15, the grommet 20c is particularly adapted to be applied to an arcuate apertured workpiece 28c since the shoulder means are of limited circumferential extent and since the work engageable surface 130 of the head section is curved to conform to the shape of the workpiece. It is to be understood that the grommet 20c may be easily modified so that it is adapted to be applied to a flat workpiece, and, in addition, the grommet structures of the embodiments described above may be modified so that they are adapted to be applied to a curved workpiece.

While the preferred embodiments of the present invention have been shown and described herein, it is obvious that many structural details may be changed without departing from the spirit and scope of the appended claims.

The invention is claimed as follows:

1. A one-piece strain relief grommet of molded plastic dielectric material adapted to be inserted substantially axially and snapped into fixed position within a complementary aperture of an apertured panel for supporting an elongated conductor of given cross section, said grommet including an axial shank comprising a pair of cooperating shank sections having side portions tapering toward their entering extremities and integrally joined by a resilient hinge co-extensive with the axial length of said side portions, said hinge serving to permit juxtapositioning of said shank sections for insertion within the panel aperture, a head portion associated with each shank section at the extremity oppositely disposed from the entering extremity thereof and having an outwardly radiating surface for engaging one side of the panel adjacent the aperture therethrough, shoulder means associated with each of said shank sections and spaced axially from the panel engaging side of the radiating surface on the head portion for engaging the opposite side of the panel adjacent the aperture therethrough, the juxtapositioned portions of the shank sections and their associated head portions defining an opening through the grommet for accommodating the elongated conductor and the opposite ends of said opening being laterally offset from each other, each said shank section presenting a single conductor-gripping wall surface within said opening and each of said wall surfaces traversing a longitudinal axis of the grommet and being in axial opposition to one another a distance to grip the given cross section of the conductor when the shank sections are juxtaposed as an incident to lateral and axial shifting thereof toward one another to impinge the conductor and secure it in clamped position within the panel-mounted grommet, said hinge being so located and of sufficient flexibility to permit relative axial shifting of said shank sections and head portions upon initial accommodation of the conductor to impart a generally helical configuration to the grommet so that, upon assembly of the grommet and conductor to the aperture of the panel, one shank section enters prior to the other shank section with the radiating surface of the head portion adjacent said one shank section engaging one side of the panel and thereafter entry of the said other shank section causes said gripping wall surfaces to relatively axially approach one another into gripping engagement with the conductor therebetween and with the shoulder means on the said other shank section engaging the other side of the panel to prevent relaxation of the gripping engagement of the conductor between said gripping wall surfaces.

2. A one-piece strain relief grommet as claimed in claim 1, wherein said conductor-gripping wall surfaces are stepped for more aggressively impinging and securely retaining the conductor clamped therebetween when the grommet is applied to the panel.

3. A one-piece strain relief grommet as claimed in claim 1, wherein said conductor-gripping wall surfaces are substantially perpendicular to the longitudinal axis of the grommet and include free marginal portions projecting substantially axially toward each other for gripping the conductor therebetween.

4. A one-piece strain relief grommet as claimed in claim 1, wherein the opening through the grommet is substantially Z-shaped with the conductor-gripping wall surfaces deforming the conductor therebetween into a substantially Z-shape.

5. A one-piece strain relief grommet as claimed in claim 4, wherein the conductor-gripping wall surfaces present reversely extending portions terminating in oppositely axially projecting ribs for gripping the conductor therebetween.

References Cited in the file of this patent

UNITED STATES PATENTS

| | | |
|---|---|---|
| 888,893 | Hays | May 26, 1908 |
| 1,398,228 | Grigsby | Nov. 29, 1921 |
| 2,134,350 | Woolley | Oct. 25, 1938 |
| 2,420,826 | Irrgang | May 20, 1947 |
| 2,518,851 | Anderson | Aug. 15, 1950 |
| 2,573,600 | Pruehs | Oct. 30, 1951 |
| 2,592,130 | Erb | Apr. 8, 1952 |
| 2,660,759 | Davis | Dec. 1, 1953 |